US012662863B2

(12) United States Patent
Chen

(10) Patent No.: US 12,662,863 B2
(45) Date of Patent: Jun. 23, 2026

(54) CAM HYDRAULIC DOOR CLOSER FOR NARROW FRAME DOOR

(71) Applicant: SUN-Q DOOR CONTROLS LIMITED, Yuanlin City (TW)

(72) Inventor: Tsung-Ching Chen, Yuanlin City (TW)

(73) Assignee: SUN-Q DOOR CONTROLS LIMITED, Yuanlin City (TW)

( * ) Notice: Subject to any disclaimer, the term of this patent is extended or adjusted under 35 U.S.C. 154(b) by 0 days.

(21) Appl. No.: 18/977,090

(22) Filed: Dec. 11, 2024

(65) Prior Publication Data

US 2025/0188781 A1 Jun. 12, 2025

(30) Foreign Application Priority Data

Dec. 11, 2023 (CN) ......................... 202323370021.6

(51) Int. Cl.
*E05F 1/08* (2006.01)

(52) U.S. Cl.
CPC ........... *E05F 1/08* (2013.01); *E05Y 2201/246* (2013.01); *E05Y 2201/254* (2013.01); *E05Y 2201/47* (2013.01); *E05Y 2201/638* (2013.01); *E05Y 2201/688* (2013.01)

(58) Field of Classification Search
CPC ..... E05F 1/08; E05F 3/12; E05F 3/227; E05F 3/104; E05F 3/10; E05F 15/50; E05Y 2201/246; E05Y 2201/254; E05Y 2201/47; E05Y 2201/638; E05Y 2201/688; E05Y 2201/10; E05Y 2600/46; E05Y 2600/626; E05Y 2600/632; E05Y 2900/132
See application file for complete search history.

(56) References Cited

U.S. PATENT DOCUMENTS 4,658,468 A * 4/1987 Tillmann ................ E05F 3/104 16/53
4,785,493 A * 11/1988 Tillmann ................ E05F 3/104 16/56

(Continued)

FOREIGN PATENT DOCUMENTS

CN 202645244 U * 1/2013
CN 210370352 U * 4/2020

(Continued)

*Primary Examiner* — William L Miller
(74) *Attorney, Agent, or Firm* — MUNCY, GEISSLER, OLDS & LOWE, P.C.

(57) ABSTRACT

The present invention belongs to the technical field of door closers, and particularly relates to a cam hydraulic door closer for a narrow frame door, which uses an embedded design, wherein a door closer main body and horizontal and vertical fasteners are fixed in a door body in an embedded installation manner. The door closer main body is positionally limited and fixed in the horizontal direction by the horizontal fastener, and positionally limited and fixed in the vertical direction by the vertical fastener. Thus, the outer surfaces of the door closer main body and the horizontal and vertical fasteners are flush with the door body, that neither takes up extra space nor affects the appearance of the door body. The door closer main body is not exposed, not easily damaged, thereby ensuring the usage performance of the cam hydraulic door closer and extending its service life.

8 Claims, 3 Drawing Sheets

(56) References Cited

U.S. PATENT DOCUMENTS 5,417,013 A * 5/1995 Tillmann ................ E05F 3/104 16/56
5,829,508 A * 11/1998 DeBower ................ E05F 3/221 160/3
5,901,412 A * 5/1999 Jentsch ................... E05F 3/104 16/60
7,966,771 B2 * 6/2011 Bienek .................... E05F 3/223 60/473
9,714,534 B1 * 7/2017 DeGott ................... E05F 3/104
2008/0047202 A1 * 2/2008 Kletscher .................. E05F 3/22 49/388
2008/0092447 A1 * 4/2008 Bienek .................... E05F 3/104 49/340
2008/0127562 A1 * 6/2008 Bienek .................... E05F 3/223 49/334
2008/0209811 A1 * 9/2008 Bienek .................... E05F 3/104 49/139
2008/0222957 A1 * 9/2008 Bienek .................... E05F 3/223 49/340
2014/0026358 A1 * 1/2014 Saito ......................... E05F 3/00 16/72
2015/0218867 A1 * 8/2015 Ishida ..................... E05F 3/102 16/62
2015/0345202 A1 * 12/2015 Nakamae .................. E05F 1/08 16/52
2016/0362924 A1 * 12/2016 Fan ........................... E05F 5/08
2017/0081892 A1 * 3/2017 Fan ........................... E05F 3/10
2018/0002965 A1 * 1/2018 Sauter ....................... E05F 3/10
2018/0030770 A1 * 2/2018 DeGott ................... E05F 3/104
2018/0283073 A1 * 10/2018 Bacchetti .............. E05F 1/1253
2020/0087966 A1 * 3/2020 Cai ........................... E05F 3/22
2021/0071458 A1 * 3/2021 Eickhoff ................. E05F 3/227
2025/0188784 A1 * 6/2025 Chen ......................... E06B 3/90
2025/0207448 A1 * 6/2025 Chen ....................... E05F 3/104
2025/0207451 A1 * 6/2025 Chen ....................... E05F 3/104

FOREIGN PATENT DOCUMENTS

CN 217354010 U * 9/2022
DE 102023204784 A1 * 11/2024 ................ E05F 3/10
EP 1431497 A2 * 6/2004 .............. E05F 3/221
EP 4575159 A1 * 6/2025 ............... E06B 3/02
EP 4575160 A1 * 6/2025 ................ E05F 3/12
GB 2268540 A * 1/1994 .............. E05F 3/104
GB 2278882 A * 12/1994 ................ E05F 3/22
GB 2501225 A * 10/2013 ................ E05F 3/22
GB 2561644 B * 6/2019 .............. E05F 3/102
JP 2025098994 A * 7/2025 ................ E05F 3/12

* cited by examiner

CAM HYDRAULIC DOOR CLOSER FOR NARROW FRAME DOOR

BACKGROUND OF THE INVENTION

1. Field of the Invention

The present invention belongs to the technical field of door closers, and particularly relates to a cam hydraulic door closer for a narrow frame door.

2. Description of the Related Art

A door closer is a spring-like hydraulic device on the door head. After the door is opened, the door closer can be compressed and then released to automatically close the door. It acts like a spring door, and can ensure that after the door is opened, the door closes accurately and promptly to the initial position. During the spring release process of the door closer, the hydraulic oil in the left chamber of the door closer is compressed, and the one-way valve is closed. The hydraulic oil can only flow out through the gap between the door closer housing and the plunger, and flow back to the right chamber through the small hole on the plunger and two flow channels equipped with throttle valve cores. Therefore, the hydraulic oil constitutes resistance to the spring release. That is, buffering effect is achieved through throttling, so that the door closing speed is controlled.

The currently commercially available door closers are disposed between the door and the door frame and mostly installed at the upper end of the door, liable to result in that in one aspect, when the door body is installed, a certain space needs to be reserved for the installation of the door closer; in another aspect, the door closer exposed outside is liable to be impacted, pressed or damaged in other ways, which will impair the usage performance of the door closer.

SUMMARY OF THE INVENTION

It is an objective of the present invention to provide a cam hydraulic door closer for a narrow frame door, which can solve the technical problems in the existing technology that most door closers are installed at the upper end of the door, requiring a reserved installation space, and they are liable to be damaged.

To attain the above objective, the embodiment of the present invention provides a cam hydraulic door closer for a narrow frame door, which is adapted for the connection of a door body with a door frame, and includes:

a door closer main body, the door closer main body being embedded in a corner of the door body and flush with the door body;

a horizontal fastener, an end of the horizontal fastener being fixed flush with the top surface of the door closer main body, another end of the horizontal fastener extending in a horizontal direction and being fixed flush with a horizontal side of the door body;

a vertical fastener, an end of the vertical fastener being fixed flush with the bottom surface of the door closer main body, another end of the vertical fastener extending in a vertical direction and being flush with the left end surface of the door closer main body, at the same time the another end of the vertical fastener being fixed flush with a vertical side of the door body; and an eccentric cam shaft, the axial direction of the eccentric cam shaft being perpendicular to the extending direction of the door closer main body, at the same time an end of the eccentric cam shaft being fixedly connected with the door frame, another end of the eccentric cam shaft being rotatably pivoted in the door closer main body.

Optionally, the horizontal fastener is configured in a straight shape, and includes a first door closer connecting plate and a first door body connecting plate, which are formed integrally, wherein the first door closer connecting plate is fixed flush with the top surface of the door closer main body by several fastening screws, and the first door body connecting plate is fixed flush with the horizontal side of the door body by several fastening screws.

Optionally, the vertical fastener is configured in an L-shape, and includes a second door closer connecting plate and a second door body connecting plate, which are formed integrally, wherein the second door closer connecting plate is disposed horizontally and fixed flush with the bottom surface of the door closer main body by several fastening screws, the second door body connecting plate is disposed vertically and flush with the left end surface of the door closer main body, and the second door body connecting plate is fixed flush with the vertical side of the door body by several fastening screws.

Optionally, the door closer main body includes:

a door closer housing, the door closer housing being provided therein along the axis direction thereof with an inner chamber filled with hydraulic oil, the eccentric cam shaft being rotatably supported in the door closer housing;

an automatic compensation valve assembly, the automatic compensation valve assembly being slidingly disposed in the inner chamber and located at the left side of the eccentric cam shaft;

a damping pressing assembly, the damping pressing assembly being slidingly disposed in the inner chamber and located at the right side of the eccentric cam shaft; and a drive spring member, the drive spring member being accommodated in the inner chamber and abutted against the damping pressing assembly and the door closer housing, the drive spring member driving the damping pressing assembly to be flexibly abutted against the outer peripheral surface of the eccentric cam shaft.

Optionally, the automatic compensation valve assembly and the damping pressing assembly collectively partition the inner chamber into a first oil channel located at the left side of the automatic compensation valve assembly, a second oil channel located at the right side of the damping pressing assembly, and a third oil channel located between the automatic compensation valve assembly and the damping pressing assembly, wherein the second oil channel communicates with the third oil channel, and the automatic compensation valve assembly is configured in a way that if the pressure in the first oil channel exceeds the threshold pressure, the automatic compensation valve assembly allows the hydraulic oil to flow between the first oil channel and the third oil channel.

Optionally, the automatic compensation valve assembly includes:

a valve piston, the valve piston being slidingly disposed in the inner chamber;

a valve body, the valve body being installed in the valve piston, at the same time the valve body being provided therethrough with a valve flow channel communicating with the first oil channel and the third oil channel;

a valve core member, the valve core member being movably disposed in the valve flow channel for realizing the open or shut of the valve flow channel; and a valve core spring, the valve core spring being accommodated in the valve flow channel, an end of the valve core spring being connected with the valve body, another end of the valve core spring being connected with the valve core member for driving the valve core member to shut off the valve flow channel.

Optionally, the damping pressing assembly includes:

a pressing piston, the pressing piston being slidingly disposed in the inner chamber, the drive spring member being abutted against the pressing piston and the door closer housing, at the same time the pressing piston being provided therethrough with a piston flow channel communicating with the second oil channel and the third oil channel;

a fixed pin, the fixed pin being fixedly disposed at an end of the pressing piston close to the eccentric cam shaft; and a damping roller, the damping roller being rotationally installed on the fixed pin, at the same time the damping roller being flexibly abutted against the outer peripheral surface of the eccentric cam shaft.

Optionally, the drive spring member includes an inner spring and an outer spring; the outer spring is sleeved outside the inner spring; an end of the outer spring and the inner spring are abutted against the door closer housing at the same time; another end of the outer spring and the inner spring are abutted against the damping pressing assembly at the same time.

The above-described one or a plurality of technical scenarios of the cam hydraulic door closer for the narrow frame door provided by the embodiment of the present invention at least has one of the following technical effects. The cam hydraulic door closer for the narrow frame door uses the embedded design, wherein the door closer main body, the horizontal fastener and the vertical fastener are fixed in the door body in an embedded installation manner. In one aspect, the door closer main body is positionally limited and fixed in the horizontal direction by the horizontal fastener. In another aspect, the door closer main body is positionally limited and fixed in the vertical direction by the vertical fastener. Thus, the outer surfaces of the door closer main body, the horizontal fastener and the vertical fastener are flush with the door body, that neither takes up extra space nor affects the appearance of the door body. Besides, the door closer main body is not exposed outside, not easily damaged, thereby ensuring the usage performance of the cam hydraulic door closer for the narrow frame door and extending its service life.

BRIEF DESCRIPTION OF THE DRAWINGS

In order to more clearly illustrate the technical scenarios in the embodiment of the present invention, the accompanying figures that need to be used in the description of the embodiment or the prior art will be briefly introduced below. Obviously, the accompanying figures in the following description are only some embodiments of the present invention. For those skilled in this field, other figures can be obtained based on these figures without exerting creative effort.

DETAILED DESCRIPTION OF THE INVENTION

Figure 1:
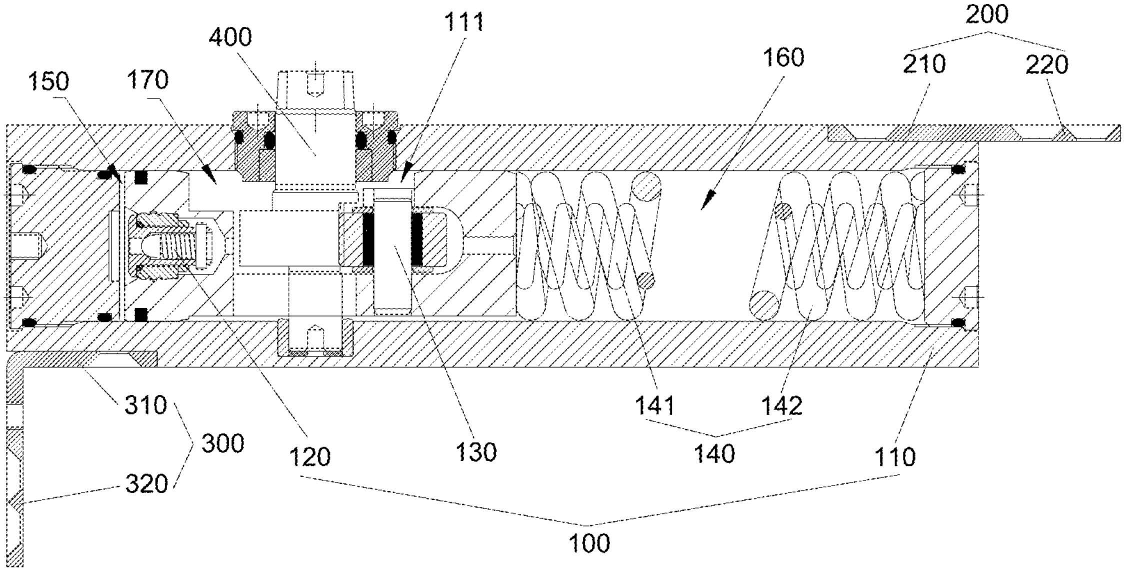
FIG. 1 is a schematic view of the internal structure of the cam hydraulic door closer for the narrow frame door provided by the embodiment of the present invention.

Embodiments of the present invention are described in detail below. The embodiments are illustrated in the accompanying figures, wherein same or similar reference numerals throughout represent same or similar elements or elements with same or similar functions. The following embodiments described with reference to the accompanying figures are illustrative, intended to explain the embodiments of the present invention, and cannot be understood as limitations of the present invention.

In the description of the embodiments of the present invention, it should be understood that the orientation or positional relationship indicated by the terms 'length', 'width', 'upper', 'lower', 'front', 'rear', 'left', 'right', 'vertical', 'horizontal', 'top', 'bottom', 'inner', 'outer', and so on are on the basis of the orientation or positional relationship shown in the accompanying figures, just for the convenience of describing the embodiments of the present invention and simplifying the description, not indicating or implying the mentioned device or element should have the specific orientation or be composed and operated with the specific orientation, and thereby cannot be understood as limitations of the present invention.

Besides, the terms 'first' and 'second' are used for the descriptive purpose only, and cannot be understood as indicating or implying the relative importance or implying specific amount of the mentioned technical feature. Thus, features prescribed with 'first' and 'second' may explicitly or implicitly include one or more the features. In the description of the embodiments of the present invention, 'a plurality of' means two or more than two, unless there is additional explicit and specific limitation.

In the description of the embodiments of the present invention, unless there is additional provision and limitation, the terms 'install', 'link', 'connect', 'fix', and so on should be understood broadly. For example, they may refer to fixed connection, or may refer to detachable connection, or being an integral; they may refer to mechanical connection, or may refer to electrical connection; they may refer to direct connection, or indirect connection through intermedium, or may refer to inner communication between two elements or interaction between two elements. For those skilled in this field, the specific meanings of the aforementioned terms in the embodiments of the present invention can be understood according to specific conditions.

Figure 2:
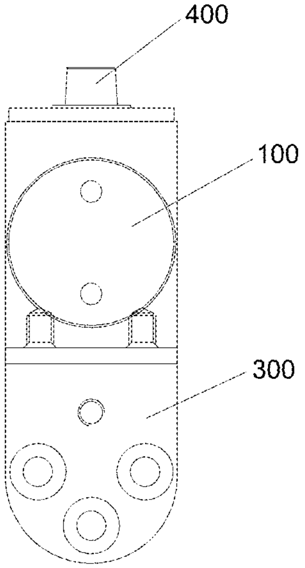
FIG. 2 is a lateral view of the cam hydraulic door closer for the narrow frame door provided by the embodiment of the present invention.
Figure 3:
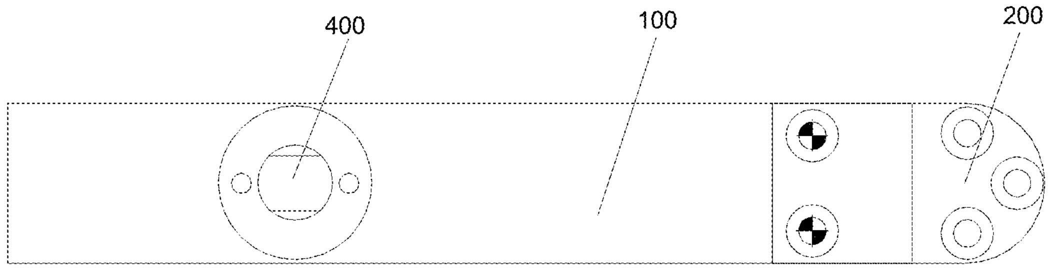
FIG. 3 is a top view of the cam hydraulic door closer for the narrow frame door provided by the embodiment of the present invention.

In a first embodiment of the present invention, as shown in FIGS. 1-3, a cam hydraulic door closer for a narrow frame door is provided, which is adapted for the connection of a door body with a door frame, and includes:

a door closer main body 100, the door closer main body 100 being embedded in a corner of the door body and flush with the door body;

- a horizontal fastener 200, an end of the horizontal fastener 200 being fixed flush with the top surface of the door closer main body 100, another end of the horizontal fastener 200 extending in a horizontal direction and being fixed flush with a horizontal side of the door body;
- a vertical fastener 300, an end of the vertical fastener 300 being fixed flush with the bottom surface of the door closer main body 100, another end of the vertical fastener 300 extending in a vertical direction and being flush with the left end surface of the door closer main body 100, at the same time the another end of the vertical fastener 300 being fixed flush with a vertical side of the door body; and
- an eccentric cam shaft 400, the axial direction of the eccentric cam shaft 400 being perpendicular to the extending direction of the door closer main body 100, at the same time an end of the eccentric cam shaft 400 being fixedly connected with the door frame, another end of the eccentric cam shaft 400 being rotatably pivoted in the door closer main body 100.

Specifically, in this embodiment, the cam hydraulic door closer for the narrow frame door uses the embedded design, wherein the door closer main body 100, the horizontal fastener 200 and the vertical fastener 300 are fixed in the door body in an embedded installation manner. In one aspect, the door closer main body 100 is positionally limited and fixed in the horizontal direction by the horizontal fastener 200. In another aspect, the door closer main body 100 is positionally limited and fixed in the vertical direction by the vertical fastener 300. Thus, the outer surfaces of the door closer main body 100, the horizontal fastener 200 and the vertical fastener 300 are flush with the door body, that neither takes up extra space nor affects the appearance of the door body. Besides, the door closer main body 100 is not exposed outside, not easily damaged, thereby ensuring the usage performance of the cam hydraulic door closer for the narrow frame door and extending its service life.

In a second embodiment of the present invention, as shown in FIG. 1, the horizontal fastener 200 is configured in a straight shape, and includes a first door closer connecting plate 210 and a first door body connecting plate 220, which are formed integrally. The first door closer connecting plate 210 is fixed flush with the top surface of the door closer main body 100 by several fastening screws, and the first door body connecting plate 220 is fixed flush with the horizontal side of the door body by several fastening screws.

Specifically, in this embodiment, the first door closer connecting plate 210 and the first door body connecting plate 220 are formed integrally, so that the whole horizontal fastener 200 has high structural strength. That is safe and reliable during subsequent use, satisfying the requirement that the door closer main body 100 is fit and installed firmly to the door body in the horizontal direction.

The other parts of this embodiment are the same with the first embodiment. The features unexplained in this embodiment all adopt the explanation in the first embodiment, not repeatedly described here.

In a third embodiment of the present invention, as shown in FIG. 1, the vertical fastener 300 is configured in an L-shape, and includes a second door closer connecting plate 310 and a second door body connecting plate 320, which are formed integrally. The second door closer connecting plate 310 is disposed horizontally and fixed flush with the bottom surface of the door closer main body 100 by several fastening screws. The second door body connecting plate 320 is disposed vertically and flush with the left end surface of the door closer main body 100, and the second door body connecting plate 320 is fixed flush with the vertical side of the door body by several fastening screws.

Specifically, in this embodiment, the second door closer connecting plate 310 and the second door body connecting plate 320 are formed integrally, so that the whole vertical fastener 300 has high structural strength. That is safe and reliable during subsequent use, satisfying the requirement that the door closer main body 100 is fit and installed firmly to the door body in the vertical direction.

The other parts of this embodiment are the same with the first embodiment. The features unexplained in this embodiment all adopt the explanation in the first embodiment, not repeatedly described here.

In a fourth embodiment of the present invention, as shown in FIG. 1, the door closer main body 100 includes:

- a door closer housing 110, the door closer housing 110 being provided therein along the axis direction thereof with an inner chamber 111 filled with hydraulic oil, the eccentric cam shaft 400 being rotatably supported in the door closer housing 110;
- an automatic compensation valve assembly 120, the automatic compensation valve assembly 120 being slidingly disposed in the inner chamber 111 and located at the left side of the eccentric cam shaft 400;
- a damping pressing assembly 130, the damping pressing assembly 130 being slidingly disposed in the inner chamber 111 and located at the right side of the eccentric cam shaft 400; and
- a drive spring member 140, the drive spring member 140 being accommodated in the inner chamber 111 and abutted against the damping pressing assembly 130 and the door closer housing 110, the drive spring member 140 driving the damping pressing assembly 130 to be flexibly abutted against the outer peripheral surface of the eccentric cam shaft 400.

Specifically, in this embodiment, when the door closer main body 100 is working, the damping pressing assembly 130 is consistently flexibly abutted against the outer peripheral surface of the eccentric cam shaft 400 by the drive spring member 140. When the eccentric cam shaft 400 rotates, it drives the damping pressing assembly 130 to tightly press the drive spring member 140, thereby realizing the force storing of the drive spring member 140. At the same time, the flowing of the hydraulic oil is realized with the automatic compensation valve assembly 120. Therefore, during the rotation of the eccentric cam shaft 400, it receives the damping effect generated from the damping pressing assembly 130 to the eccentric cam shaft 400 and the damping effect of the hydraulic oil, that lowers the transient door closing speed, thereby achieving sufficient buffering.

The other parts of this embodiment are the same with the first embodiment. The features unexplained in this embodiment all adopt the explanation in the first embodiment, not repeatedly described here.

In a fifth embodiment of the present invention, as shown in FIG. 1, the automatic compensation valve assembly 120 and the damping pressing assembly 130 collectively partition the inner chamber 111 into a first oil channel 150 located at the left side of the automatic compensation valve assembly 120, a second oil channel 160 located at the right side of the damping pressing assembly 130, and a third oil channel 170 located between the automatic compensation valve assembly 120 and the damping pressing assembly 130. The second oil channel 160 communicates with the third oil channel 170, and the automatic compensation valve assembly 120 is configured in a way that if the pressure in the first oil channel 150 exceeds a threshold pressure, the automatic compensation valve assembly 120 allows the hydraulic oil to flow between the first oil channel 150 and the third oil channel 170.

Specifically, in this embodiment, the first oil channel 150, the second oil channel 160 and the third oil channel 170 are all filled with hydraulic oil. The door closer housing 110 can rotate along with the rotation of the door body, so as to change the position of the damping pressing assembly 130 on the eccentric cam shaft 400, thereby changing the volume of the second oil channel 160. Then, the hydraulic oil flows between the second oil channel 160 and the third oil channel 170, resulting in a pressure difference between the first oil channel 150 and the third oil channel 170. That changes the status of the automatic compensation valve assembly 120 to cause the hydraulic oil corresponding flowing between the first oil channel 150 and the third oil channel 170 to balance the pressure difference between the first oil channel 150 and the third oil channel 170. That is, the hydraulic oil in the first oil channel 150, the second oil channel 160 and the third oil channel 170 can flow in coordination with the action of the door body.

The other parts of this embodiment are the same with the fourth embodiment. The features unexplained in this embodiment all adopt the explanation in the fourth embodiment, not repeatedly described here.

Figure 4:
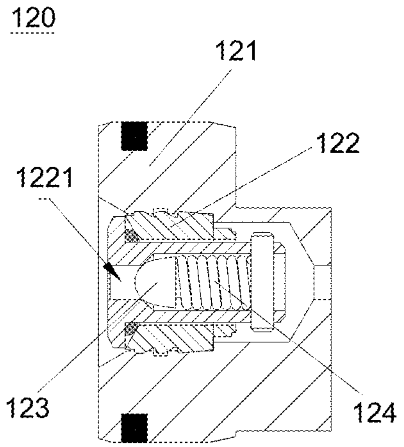
FIG. 4 is a schematic view of the internal structure of the automatic compensation valve assembly provided by the embodiment of the present invention.

In a sixth embodiment of the present invention, as shown in FIG. 4, the automatic compensation valve assembly 120 includes:

a valve piston 121, the valve piston 121 being slidingly disposed in the inner chamber 111;

a valve body 122, the valve body 122 being installed in the valve piston 121, at the same time the valve body 122 being provided therethrough with a valve flow channel 1221 communicating with the first oil channel 150 and the third oil channel 170;

a valve core member 123, the valve core member 123 being movably disposed in the valve flow channel 1221 for realizing the open or shut of the valve flow channel 1221; and a valve core spring 124, the valve core spring 124 being accommodated in the valve flow channel 1221, an end of the valve core spring 124 being connected with the valve body 122, another end of the valve core spring 124 being connected with the valve core member 123 for driving the valve core member 123 to shut off the valve flow channel 1221.

Specifically, in this embodiment, the movement of the valve core member 123 can realize the open or shut of the valve flow channel 1221. The disposal of the valve core spring 124 can ensure the accuracy of the movement of the valve core member 123. When the first oil channel 150 and the third oil channel 170 have a pressure difference therebetween, it can push the valve core member 123 to overcome the elastic force of the valve core spring 124 so as to move in the valve flow channel 1221 to realize the open of the valve flow channel 1221. After the pressure difference between the first oil channel 150 and the third oil channel 170 is balanced, the valve core member 123 is pushed by the elastic force of the valve core spring 124 to restore its position by moving in the valve flow channel 1221, thereby realizing the shut of the valve flow channel 1221. The status of the automatic compensation valve assembly 120 is automatically changed, and the reliability is high.

The other parts of this embodiment are the same with the fifth embodiment. The features unexplained in this embodiment all adopt the explanation in the fifth embodiment, not repeatedly described here.

Figure 5:
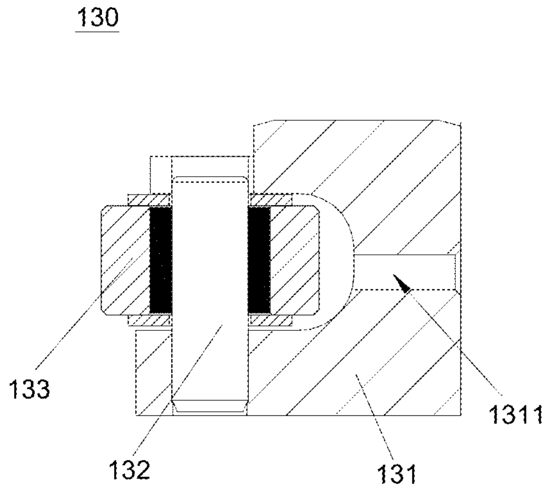
FIG. 5 is a schematic view of the internal structure of the damping pressing assembly provided by the embodiment of the present invention.

In a seventh embodiment of the present invention, as shown in FIG. 5, the damping pressing assembly 130 includes:

a pressing piston 131, the pressing piston 131 being slidingly disposed in the inner chamber 111, the drive spring member 140 being abutted against the pressing piston 131 and the door closer housing 110, at the same time the pressing piston 131 being provided therethrough with a piston flow channel 1311 communicating with the second oil channel 160 and the third oil channel 170;

a fixed pin 132, the fixed pin 132 being fixedly disposed at an end of the pressing piston 131 close to the eccentric cam shaft 400; and a damping roller 133, the damping roller 133 being rotationally installed on the fixed pin 132, at the same time the damping roller 133 being flexibly abutted against the outer peripheral surface of the eccentric cam shaft 400.

Specifically, in this embodiment, the pressing piston 131 is slidingly fit with the inner wall of the inner chamber 111, that reduces the direction guiding structure in coordination with the axial direction of the pressing piston 131. During the use, the pressing piston 131 is moved by being pushed by the drive spring member 140. Under the direction guiding effect of the inner chamber 111, the pressing piston 131 is moved along the length direction of the door closer housing 110, so as to push the damping roller 133 to be accurately abutted on the eccentric cam shaft 400, raising the operational reliability.

The other parts of this embodiment are the same with the fifth embodiment. The features unexplained in this embodiment all adopt the explanation in the fifth embodiment, not repeatedly described here.

In an eighth embodiment of the present invention, as shown in FIG. 1, the drive spring member 140 includes an inner spring 141 and an outer spring 142. The outer spring 142 is sleeved outside the inner spring 141. An end of the outer spring 142 and the inner spring 141 are abutted against the door closer housing 110 at the same time. Another end of the outer spring 142 and the inner spring 141 are abutted against the damping pressing assembly 130 at the same time.

Specifically, in this embodiment, the drive spring member 140 has simple structure and reasonable design. When the drive spring member 140 receives a force and be lengthened or shortened, the inner spring 141 and the outer spring 142 are both correspondingly lengthened or shortened without interference with each other. Therefore, the inner spring 141 and the outer spring 142 are uneasy to be deformed when used together, effectively raising the service life of the inner spring 141 and the outer spring 142. The composite design highly increases the elasticity of the drive spring member 140, ensuring the perpendicular stability of the spring force and effectively preventing the inner spring 141 and the outer spring 142 from damage due to excessive load.

The other parts of this embodiment are the same with the fourth embodiment. The features unexplained in this embodiment all adopt the explanation in the fourth embodiment, not repeatedly described here.

The above description is only the preferred embodiments of the present invention, not intended to limit the present invention. Any modification, equivalent substitution and improvement made within the spirit and principle of the present invention should be included within the claimed scope of the present invention.

What is claimed is:

1. A cam hydraulic door closer for a narrow frame door, which is adapted for a connection of a door body with a door frame, the cam hydraulic door closer comprising:

a door closer main body, the door closer main body being embedded in a corner of the door body and flush with the door body;

a horizontal fastener, an end of the horizontal fastener being fixed flush with a top surface of the door closer main body, another end of the horizontal fastener extending in a horizontal direction and being fixed flush with a horizontal side of the door body;

a vertical fastener, an end of the vertical fastener being fixed flush with a bottom surface of the door closer main body, another end of the vertical fastener extending in a vertical direction and being flush with a left end surface of the door closer main body, and said another end of the vertical fastener being fixed flush with a vertical side of the door body; and an eccentric cam shaft, an axial direction of the eccentric cam shaft being perpendicular to an extending direction of the door closer main body, and an end of the eccentric cam shaft being fixedly connected with the door frame, another end of the eccentric cam shaft being rotatably pivoted in the door closer main body.

2. The cam hydraulic door closer as claimed in claim 1, wherein the horizontal fastener is configured in a straight shape, and comprises a first door closer connecting plate and a first door body connecting plate, which are formed integrally; the first door closer connecting plate is fixed flush with the top surface of the door closer main body by at least one fastening screws, and the first door body connecting plate is fixed flush with the horizontal side of the door body by at least one fastening screws.

3. The cam hydraulic door closer as claimed in claim 1, wherein the vertical fastener is configured in an L-shape, and comprises a door closer connecting plate and a door body connecting plate, which are formed integrally; the door closer connecting plate is disposed horizontally and fixed flush with the bottom surface of the door closer main body by at least one fastening screws; the door body connecting plate is disposed vertically and flush with the left end surface of the door closer main body, and the door body connecting plate is fixed flush with the vertical side of the door body by at least one fastening screws.

4. The cam hydraulic door closer as claimed in claim 1, wherein the door closer main body comprises:

a door closer housing, the door closer housing being provided therein along an axis direction thereof with an inner chamber filled with hydraulic oil, the eccentric cam shaft being rotatably supported in the door closer housing;

an automatic compensation valve assembly, the automatic compensation valve assembly being slidingly disposed in the inner chamber and located at a left side of the eccentric cam shaft;

a damping pressing assembly, the damping pressing assembly being slidingly disposed in the inner chamber and located at a right side of the eccentric cam shaft; and a drive spring member, the drive spring member being accommodated in the inner chamber and abutted against the damping pressing assembly and the door closer housing, the drive spring member driving the damping pressing assembly to be flexibly abutted against an outer peripheral surface of the eccentric cam shaft.

5. The cam hydraulic door closer as claimed in claim 4, wherein the automatic compensation valve assembly and the damping pressing assembly collectively partition the inner chamber into a first oil channel located at a left side of the automatic compensation valve assembly, a second oil channel located at a right side of the damping pressing assembly, and a third oil channel located between the automatic compensation valve assembly and the damping pressing assembly; the second oil channel communicates with the third oil channel, and the automatic compensation valve assembly is configured such that if pressure in the first oil channel exceeds a threshold pressure, the automatic compensation valve assembly allows the hydraulic oil to flow between the first oil channel and the third oil channel.

6. The cam hydraulic door closer as claimed in claim 5, wherein the automatic compensation valve assembly comprises:

a valve piston, the valve piston being slidingly disposed in the inner chamber;

a valve body, the valve body being installed in the valve piston, and the valve body being provided therethrough with a valve flow channel communicating with the first oil channel and the third oil channel;

a valve core member, the valve core member being movably disposed in the valve flow channel for realizing open or shut of the valve flow channel; and a valve core spring, the valve core spring being accommodated in the valve flow channel, an end of the valve core spring being connected with the valve body, another end of the valve core spring being connected with the valve core member for driving the valve core member to shut off the valve flow channel.

7. The cam hydraulic door closer as claimed in claim 5, wherein the damping pressing assembly comprises:

a pressing piston, the pressing piston being slidingly disposed in the inner chamber, the drive spring member being abutted against the pressing piston and the door closer housing, and the pressing piston being provided therethrough with a piston flow channel communicating with the second oil channel and the third oil channel;

a fixed pin, the fixed pin being fixedly disposed at an end of the pressing piston close to the eccentric cam shaft; and a damping roller, the damping roller being rotationally installed on the fixed pin, and the damping roller being flexibly abutted against the outer peripheral surface of the eccentric cam shaft.

8. The cam hydraulic door closer as claimed in claim 4, wherein the drive spring member comprises an inner spring and an outer spring; the outer spring is sleeved outside the inner spring; an end of the outer spring and the inner spring are each abutted against the door closer housing; another end of the outer spring and the inner spring are each abutted against the damping pressing assembly.

* * * * *